United States Patent Office 3,163,698
Patented Dec. 29, 1964

3,163,698
SPECTROSCOPIC APPARATUS HAVING AN OBLIQUE MONITOR RADIATION EXIT SLIT
Jason L. Saunderson, Lexington, and Eliot Du Bois, Lincoln, Mass., assignors to Baird-Atomic, Inc., Cambridge, Mass., a corporation of Massachusetts
Filed Oct. 20, 1960, Ser. No. 63,785
2 Claims. (Cl. 88—14)

The present invention relates to spectrum analysis and, more particularly, to spectrometers of the so-called "direct reading" type which automatically indicate the chemical composition of a specimen by determining the intensity distribution of radiation of characteristic wavelength emitted by the specimen under excitation.

By way of example, a typical direct reading spectrometer comprises an entrance slit that transmits radiation from an electrically excited specimen, a curved diffraction grating that forms a spectrum from radiation so transmitted, and a plurality of exit slits that transmit components of specimen radiation of preselected wavelengths to photocells in order to determine the differing intensities at these wavelengths. In such a spectrometer, the spacial relationships among the entrance slits, the grating and the exit slits are so critical that minor changes in ambient temperature, for example, may cause their misalignment and, in consequence, a spectrum shift capable of introducing errors into the determination of the intensities.

It has been proposed that the automatic correction of any such misalignment be effected by an automatic servo system that is photoelectrically controlled by what may be termed "monitor radiation." Such monitor radiation, in one form, is generated by a source that is distinct from the source of specimen radiation. The operation is such that misalignment among the grating and the entrance and exit slits for the components of specimen radiation under analysis is accompanied inherently by analagous misalignment among the grating and the entrance and exit slits for the component of monitor radiation. The servo system for maintaining predetermined orientations of the grating and the entrance and exit slits is responsive to the instantaneous orientation of the monitor radiation. In the prior art, one way of determining the orientation of the monitor radiation is to direct it to a photocell through a pair of offset exit slits. More exactly, the entrance slit is imaged on the exit slits as a so-called spectrum line. The monitor radiation transmitted through the offset exit slits indicates no misalignment when the intensity flux through both slits is equal but indicates a deflection to one side or the other when the intensity flux through one slit is greater than the intensity flux through the other. However, it has been found that in the case of certain monitor radiation, especially at very high dispersion, the spectrum line can be quite broad and have fine structure. Under these circumstances, the servo system tends to "lock" onto a part of the spectrum line rather than onto the spectrum line as a whole.

The primary object of the present invention is the elimination of the foregoing difficulty by the use of a single tilted monitor exit slit behind which are disposed a pair of photodetectors. As will be indicated more fully below, the relationship between the vertical monitor exit line and the tilted monitor exit slit is such that, at one relative position of the vertical monitor exit line and the tilted monitor exit slit, the light flux through the top of the slit toward he upper photodetector is equal to the light flux through the bottom of the slit toward the lower photodector. On the other hand, when there is a misalignment, it will be indicated by a greater light flux through either the top or the bottom of the tilted slit and, in consequence, a greater output signal for the photodetector associated with either the top or the bottom of the tilted slit.

Another object of the present invention is to provide a novel system by which the two monitor photodetectors are controlled. In this system, the photodetectors are photomultipliers, which are sinusoidally varied in sensitivity by signals applied to selected dynodes to provide signals useful in the remaining circuitry.

Other objects of the present invention will in part be obvious and will in part appear hereinafter.

The invention accordingly comprises the apparatus possessing the features, propertiees and relations among components that will be exemplified in the following detailed disclosure, and in the scope of which will be indicated in the appended claims.

For a fuller understanding of the nature and objects of the present invention, reference should be had to the following detailed description, taken in connection with the accompanying drawings wherein.

Figure 1:
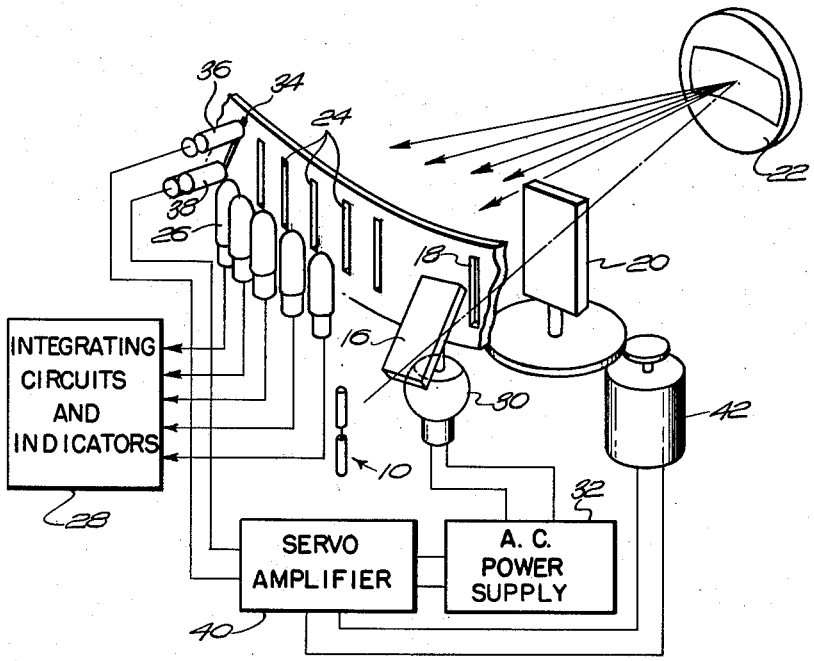
FIG. 1 is a partially perspective and partially schematic diagram of a system embodying the present invention.

The mechanical components of the spectrometer of FIG. 1, in operation, are enclosed within a housing that shields its interior from ambient radiation capable of affecting the system now to be described. This system serves to indicate the chemical composition of a specimen by determining the intensity distribution, at selected wavelengths, of radiation emitted by the specimen under excitation in an arc mount assembly 10. In conventional fashion arc mount assembly 10 comprises a pair of electrodes 12 and 14, for example, in the form of two pins composed of the specimen material. Associated with arc mount assembly 10 is a circuit (not shown) for generating a suitable voltage across the gap between the inner ends of the electrodes 12 and 14 in order to produce an electrical discharge that is accompanied by the characteristic radiation from the specimen. Radiation from the gap between the inner ends of electrodes 12 and 14 is directed through a partially transmitting-partially reflecting plate 16, an entrance slit 18 and a rotatable transparent deflecting plate 20 to a concave grating 22 in order to produce a spectrum. Preselected lines of the spectrum are directed through respective speciment exit slits 24 toward respective photomultiplier tubes 26 in association with appropriate integrating circuits 28. The integrating circuits indicators and related circuitry are known in the prior art as disclosed specifically in: U.S. Patent No. 2,577,814, issued December 11, 1951 to Jason L. Saunderson for Photoelectric Instrument For Direct Spectrochemical Analysis By the Internal Standard Method; U.S. Patent No. 2,577,815, issued on the same date to the same inventor for an invention of the same name; U.S. Patent No. 2,647,236, issued July 28, 1953 to Jason L. Saunderson for Electrical Circuit For Measuring the Ratio of Two Potentials; and U.S. Patent No. 2,807,677, issued on September 24, 1957 to Victor J. Caldecourt for Stable Direct-Current Amplifier. In order to minimize even slight disturbances of the spacial relationships on the various aforementioned components, they are mounted on a sturdy A-shaped frame of the type shown in Patent No. 2,937,561, issued on May 24, 1960 in the names of J. L. Saunderson and Eliot Du Bois for "Spectroscopic Apparatus." This frame has intersecting longitudinal legs and short cross-pieces constructed from heavy gauge channel stock. Nevertheless, as indicated above, because of the relatively great distance between the grating at one end of this frame and the entrance and exit slits at the other end, small temperature changes tend to disorient the grating with respect to the entrance and exit slits. In accordance with the present invention, proper orientation is ensured by the automatic servo system now to be described.

This servo system is photoelectrically controlled by monitor radiation from a lamp 30 that produces radiation of sinusoidally varying amplitude by virtue of an alternating current power supply 32. Radiation from lamp 30 is reflected by plate 16 through entrance slit 18 and deflecting plate 20 to grating 22 by which it is diffracted toward a tilted slit 34 behind which are disposed a pair of photomultiplier tubes 36 and 38. Monitor radiation originating during both phases of the line voltage from power supply 32 is transmitted through both the upper and lower portions of tilted slit 34. Photomultiplier tubes 36 and 38 are electronically gated so that each tube responds only to the light falling upon it during alternate half cycles of the line voltage. These photomultiplier tubes are connected in parallel to a servo amplifier 40 which controls the orientation of plate 20, and consequently the orientation of the beam of radiation through entrance slit 18, through a servo motor 42. The synchronized relationships between the sinusoidal modulation of light source 30 and the sinusoidal modulation (gating) of photomultipliers 36 and 38 are shown in the prior art as disclosed in U.S. Patent No. 2,837,959, issued June 10, 1958 to Jason L. Saunderson for Automatic Means For Aligning Spectroscopic Components.

Figure 2:
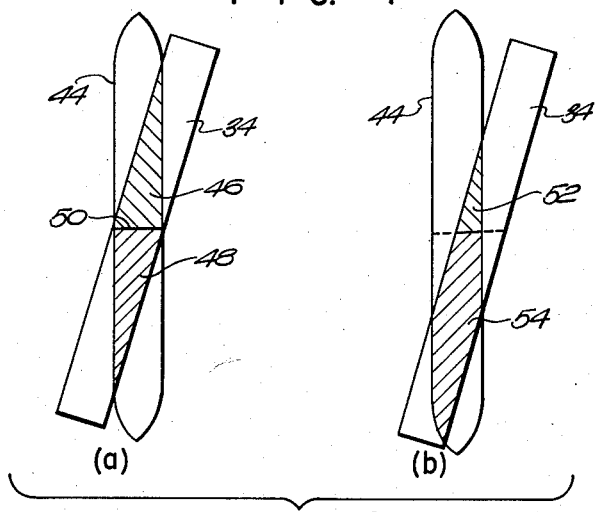
FIG. 2 illustrates the interaction of the vertical monitor exit line and the tilted monitor exit slit of the servo system of FIG. 1.

In FIG. 2(a), a monitor spectrum line 44 is shown in superposition on slanted slit 34. It is apparent that at certain relative positions the radiation flux 46 through the upper half of slit 34 is equal in intensity to the radiation flux 48 through the lower half 34, the upper and lower halves being separated by line 50. However, as shown in FIG. 2(a), when the relative positions of spectrum line 44 and slit 34 have changed in one direction, the light flux 52 through the upper half of slit 34 is lower in intensity than the light flux 54 through the lower half of slit 34. Conversely, when the relative positions have changed in the opposite direction, the light flux through the upper half of slit 34 is greater in intensity than the light flux through the lower half of slit 34.

Figure 3:
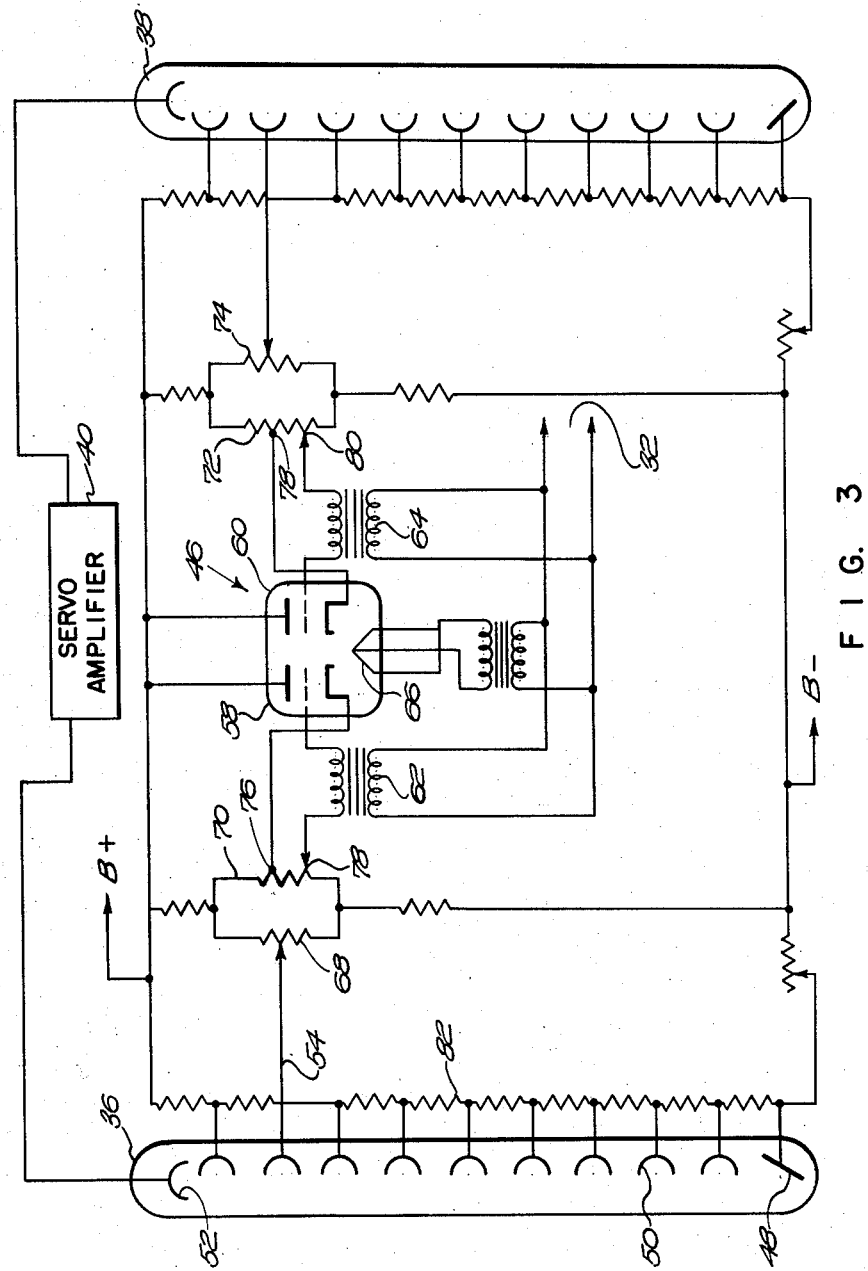
FIG. 3 is an electrical schematic diagram of the system of FIG. 1.

The schematic electrical diagram of FIG. 3 shows, in conjunction with photomultiplier tube 36 and photomultiplier tube 38 a servo amplifier 40 for generating sinusoidal voltages for application to servo motor 42. When these voltages are equal in intensity, servo motor 42 remains inoperative. However, when these voltages are unbalanced servo motor 42 rotates in one direction or the other depending on the direction of the unbalance. These voltages are generated by the circuit shown generally at 46.

Circuit 46 includes a double triode 58, 60, the grids of which are controlled by alternating voltages applied from transformers 62, 64 that are energized by alternating current power supply 32. The cathodes of triode 58, 60 are heated in conventional fashion as at 66. Extending between B+ and B− are two pairs of potentiometers 68, 70 and 72, 74. Potentiometer 70 locks the cathode of triode 58 at a fixed potential 76 and permits the potential of the grid of triode 58 to be adjusted as at 8. Potentiometer 72 locks the cathode of triode 60 at a fixed potential and permits the potential of the grid of triode 60 to be adjusted as at 80. Each of photomultipliers 36 and 38 is shown as including a cathode 48, a plurality of dynodes 50 and an anode 52. With one exception, the dynodes are maintained at a series of increasing potentials by a suitable voltage divider 82. However, the instantaneous potential of one dynode is determined as at 54 by potentiometer 68 in the case of photomultiplier 36 and by potentiometer 74 in the case of photomultiplier 38. It will be observed that as the potential across potentiometer 70 varies in response to transformer 62, the voltage across potentiometer 68 varies also. In consequence, the potential at 54 varies and the output of the photomultiplier tube varies sinusoidally.

In operation, specimen radiation from arc mount 10 is transmitted through slanted plate 16, slit 18 and rotatable plate 20 to grating 22 and is diffracted by grating 22 through exit slits 24 to photomultiplier tubes 26. The composition of the specimen is indicated by the indicators at 28 in response to an analysis of the relative intensities of the radiation received by phototubes 26. Any disorientation of entrance slit 18, grating 22 and exit slit 34 results in an unbalance of the intensities of beams of monitor radiation from lamp 30 reaching photomultipliers 36 and 38 and consequently an unbalance in the two sinusoidal voltages applied to servo motor 42 via circuit 46 of FIG. 3. The present invention thus provides a simple but efficacious system for utilizing monitor radiation of complex spectral characteristics in a servo system of the illustrated type.

Since certain changes may be made in the above device without departing from the scope of the invention herein involved, it is intended that all matter contained in the above description or shown in the accompanying drawings shall be interpreted in an illustrative and not in a limiting sense.

What is claimed is:

1. Spectroscopic apparatus comprising horizontally extending base means, source means on said base means for exciting chemical material to emit characteristic radiation, monitor means on said base for emitting monitor radiation, spectral means on said base means oriented and positioned to receive said characteristic radiation from said source means and to disperse said characteristic radiation horizontally into a spectrum and to receive said monitor radiation from said monitor means and to redirect said monitor radiation predeterminedly with respect to said spectrum, characteristic radiation detecting means on said base means oriented and positioned to receive individual components of said spectrum in order to produce signals indicating characteristics of said chemical material, monitor radiation detecting means on said base means oriented and positioned to receive monitor radiation redirected by said spectral means in order to produce signals in response thereto, said source means, said spectral means, said characteristic radiation detecting means and said monitor radiation detecting means having geometrical relationships that are subject to change, said spectral means having a vertical axis of rotation perpendicular to said base means, entrance means providing at least a first given slit disposed in the path of said characteristic radiation and said monitor radiation between said source means and said monitor means on one side and said spectral means on the other side, said first given slit extending vertically and being parallel to said axis, said characteristic radiation detecting means including exit means providing a plurality of slits disposed in the paths of said individual components of characteristic radiation between said spectral means and remaining components of said characteristic radiation detecting means, said plurality of slits being substantially parallel to said given slit of said entrance means, said monitor radiation detecting means including exit means providing a slit disposed in the path of said monitor radiation between said spectral means and remaining components of said monitor radiation detecting means, said slit of said monitor radiation detecting means being oblique with respect to said axis, said detecting means including first photodetecting means to receive a first portion of radiation transmitted through said slit of said monitor radiation detecting means and second photodetecting means to receive a second portion of radiation transmitted through said slit of said monitor radiation detecting means, said monitor radiaton detecting means responding to said monitor radiation through said slit thereof to produce error signals, and servo means responsive to said error signals to alter said geometrical relationships in order to eliminate said error signals.

2. The spectroscopic apparatus of claim 1 wherein said spectral means is a diffraction grating.

References Cited in the file of this patent
UNITED STATES PATENTS
2,937,561    Saunderson et al. -------- May 24, 1960